No. 828,772. PATENTED AUG. 14, 1906.
T. PATTERSON.
WIRE FENCE MAKING MACHINE.
APPLICATION FILED FEB. 19, 1904.
6 SHEETS—SHEET 1.
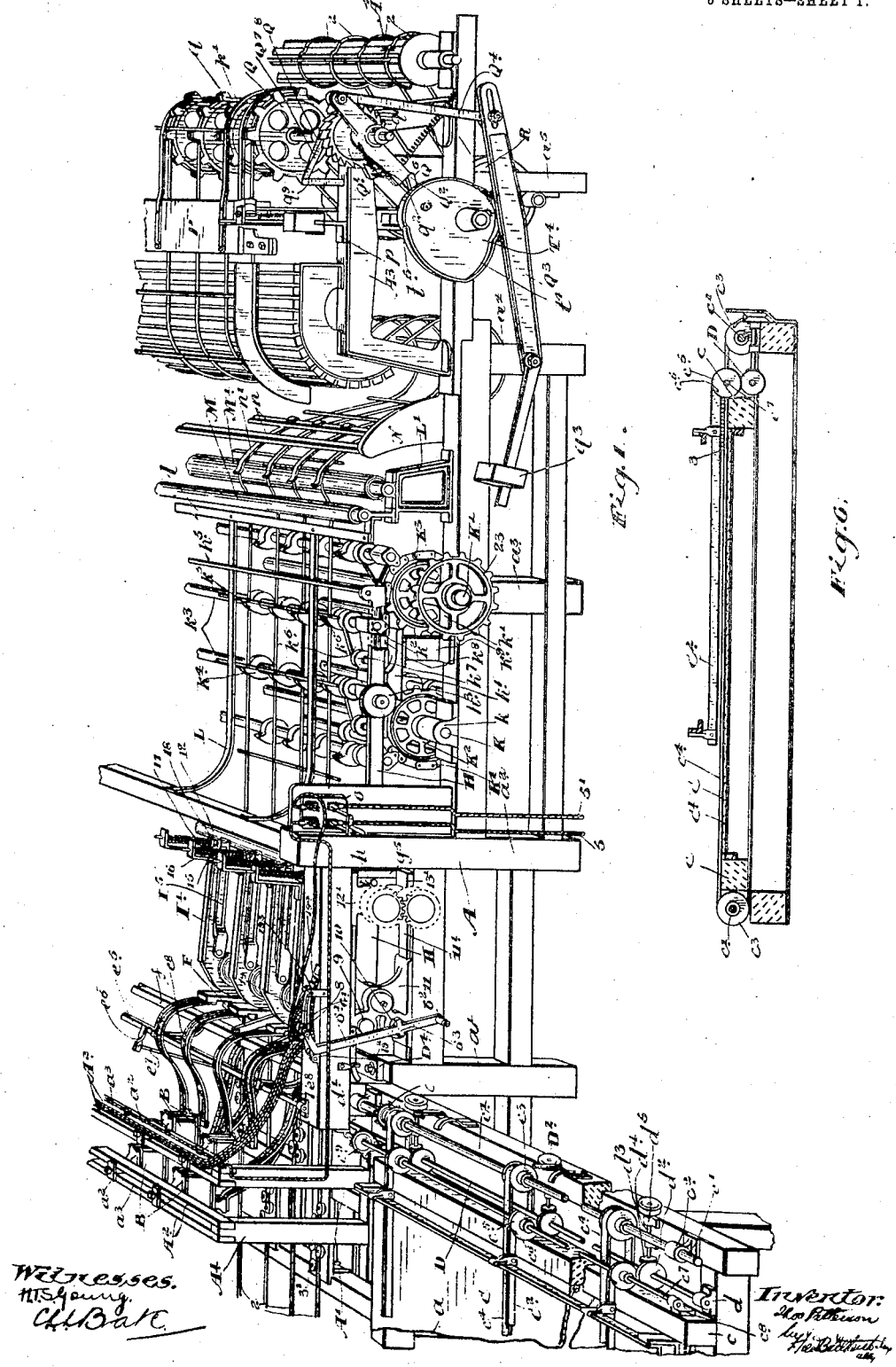

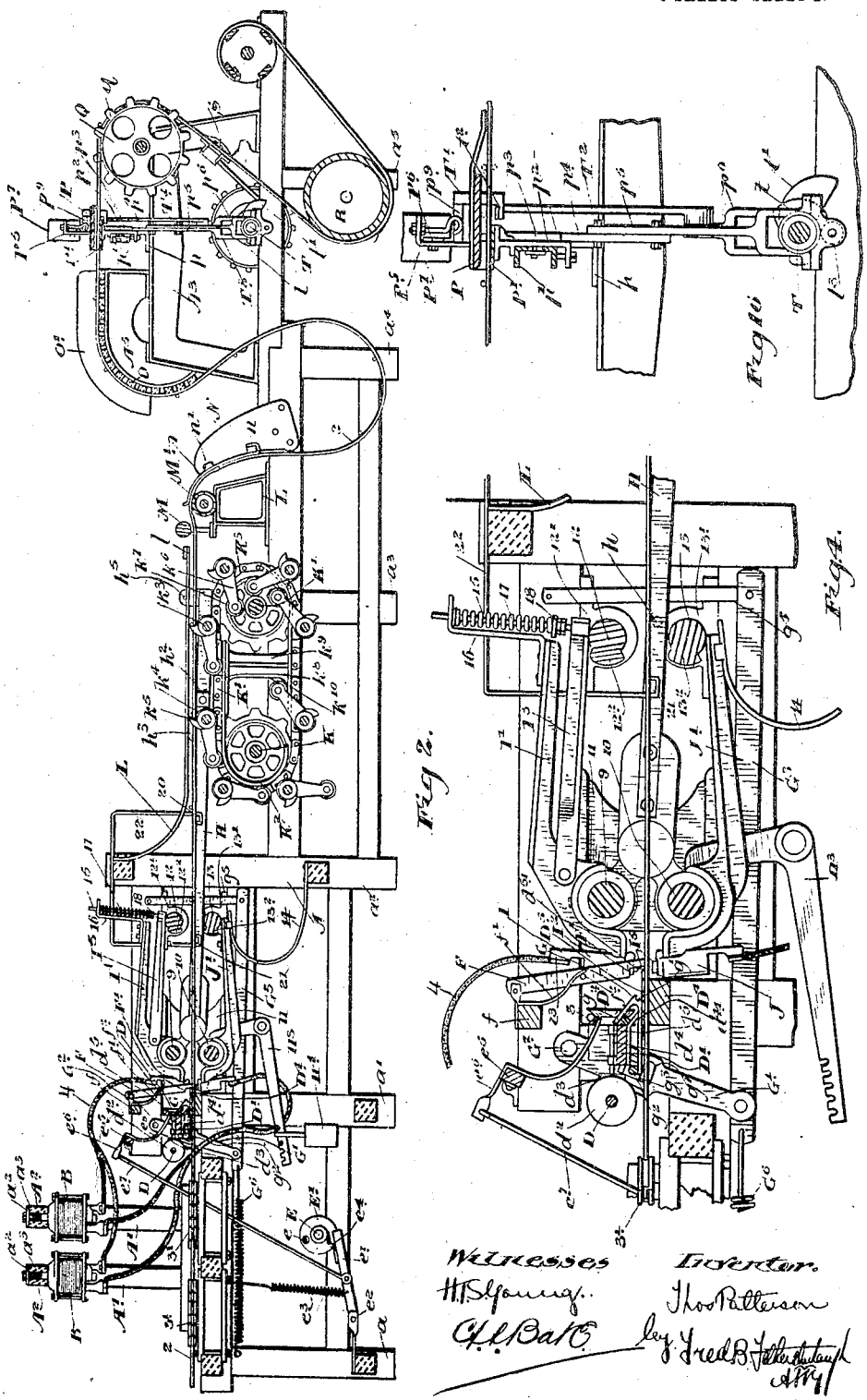

No. 828,772. PATENTED AUG. 14, 1906.
T. PATTERSON.
WIRE FENCE MAKING MACHINE.
APPLICATION FILED FEB. 19, 1904.
6 SHEETS—SHEET 3.
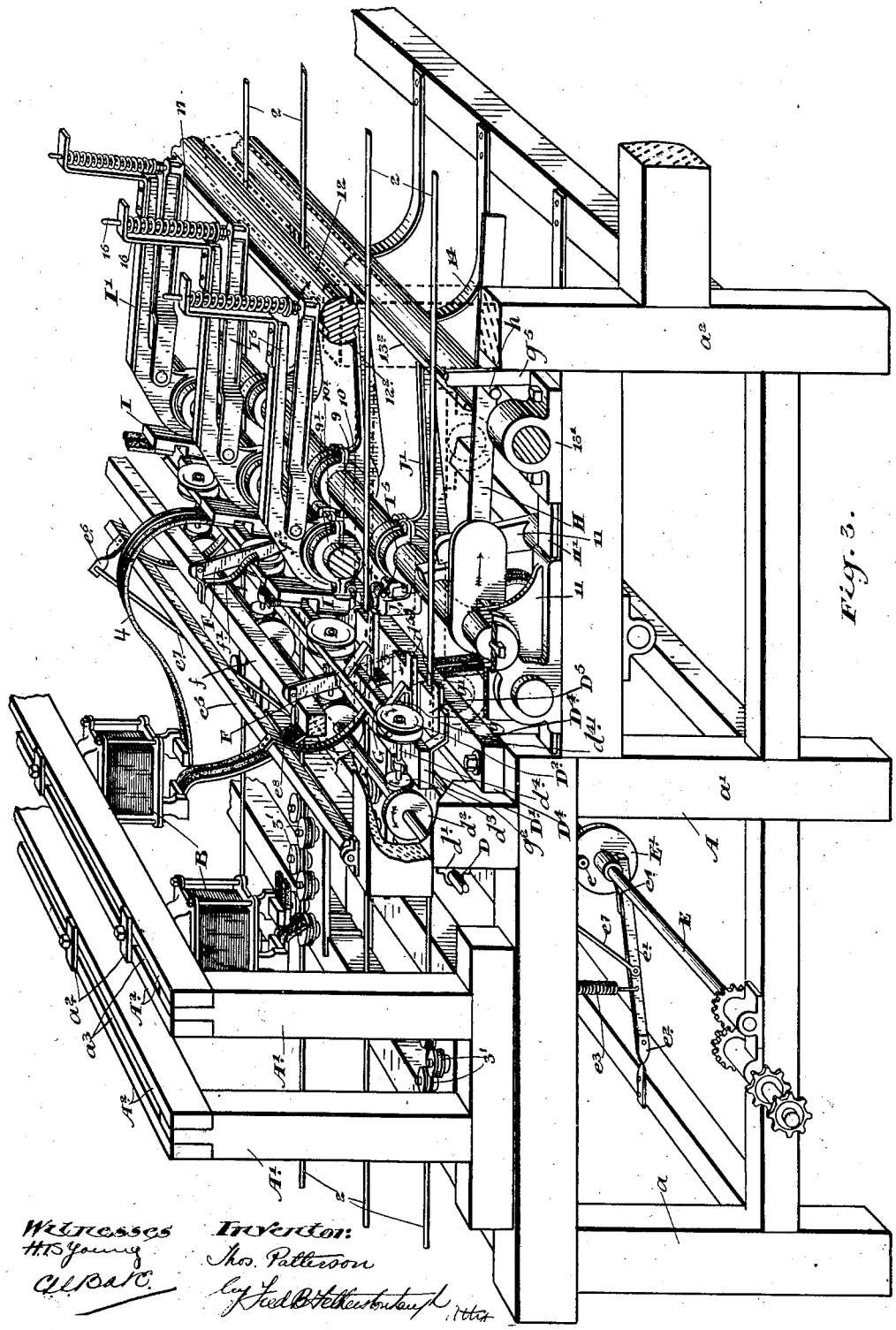

No. 828,772. PATENTED AUG. 14, 1906.
T. PATTERSON.
WIRE FENCE MAKING MACHINE.
APPLICATION FILED FEB. 19, 1904.
6 SHEETS—SHEET 4.
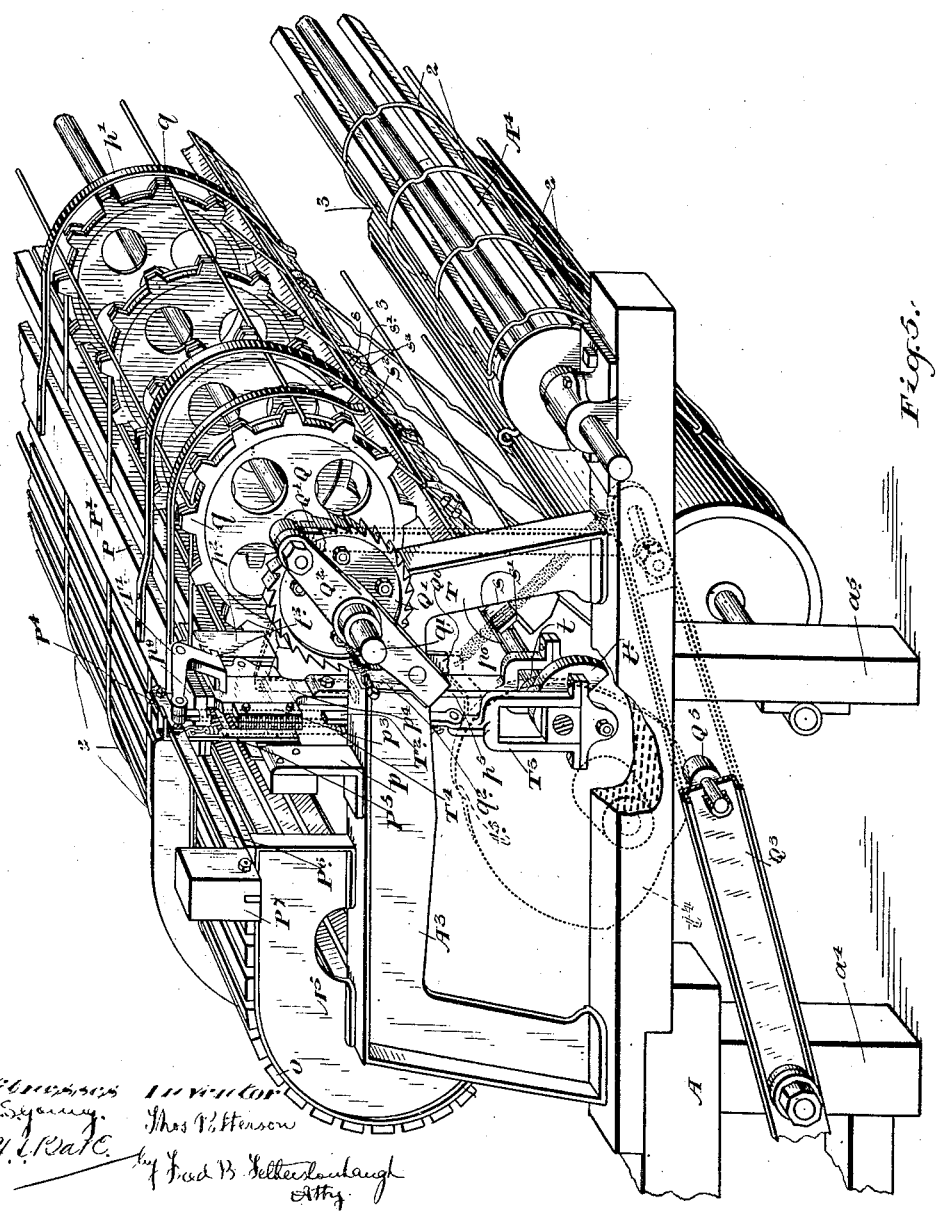

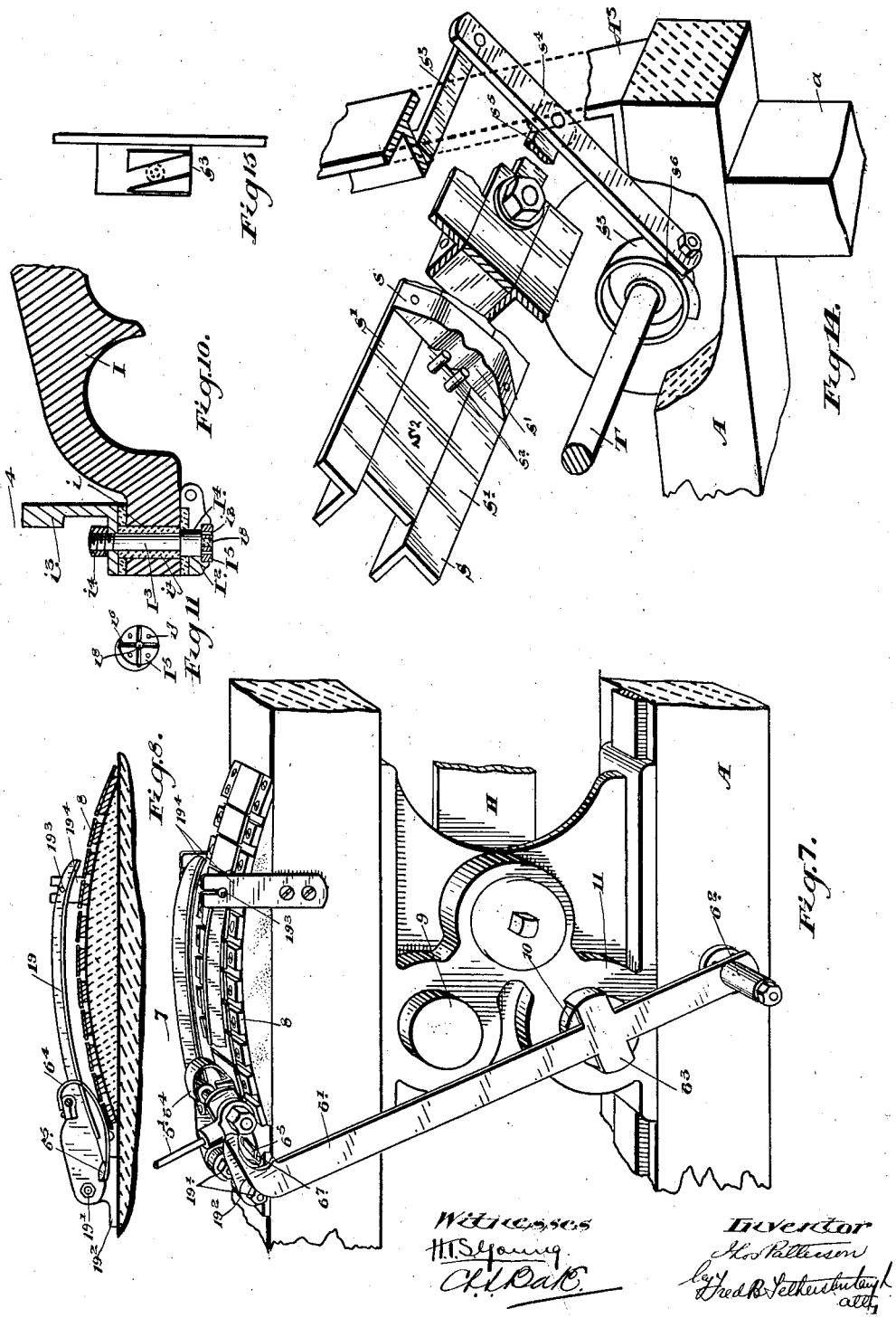

No. 828,772. PATENTED AUG. 14, 1906.
T. PATTERSON.
WIRE FENCE MAKING MACHINE.
APPLICATION FILED FEB. 19, 1904.
6 SHEETS—SHEET 6.
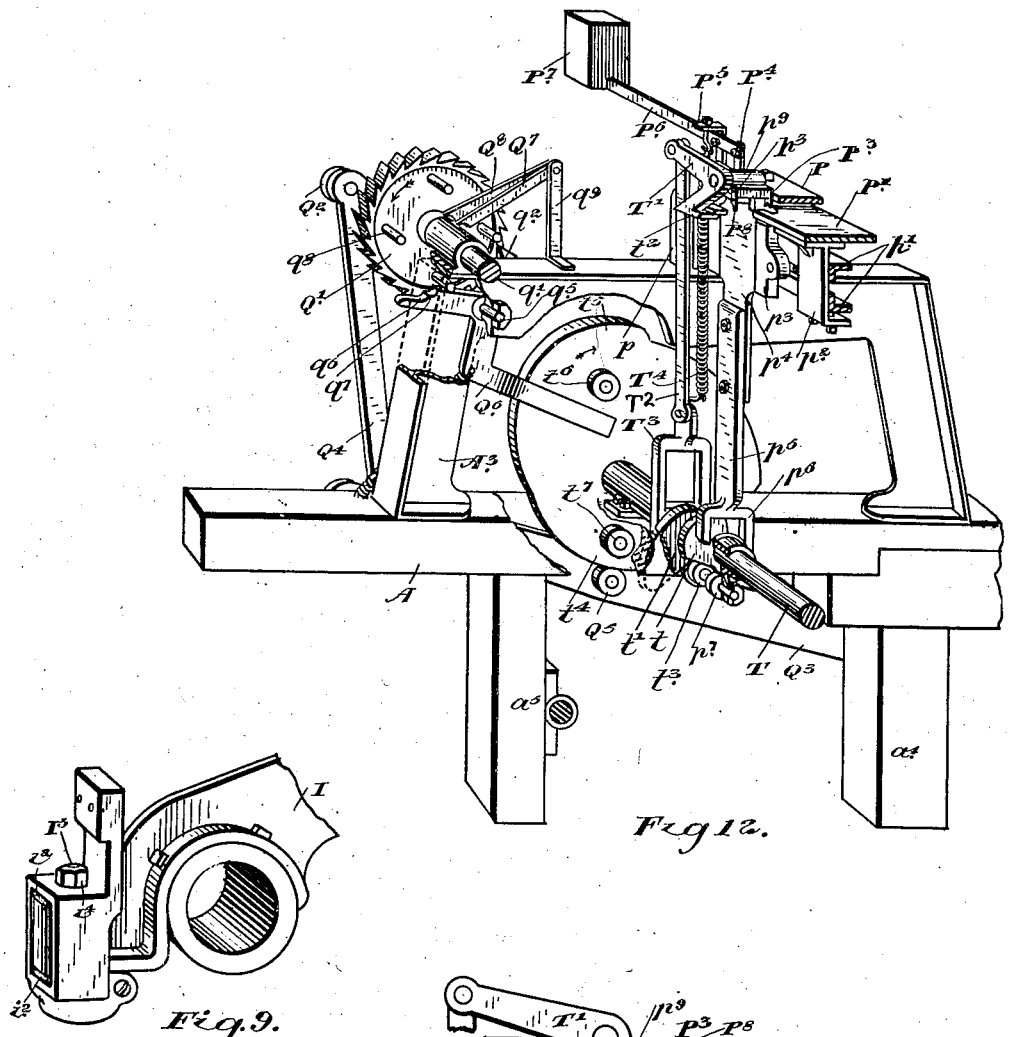
Fig. 12.
Fig. 9.
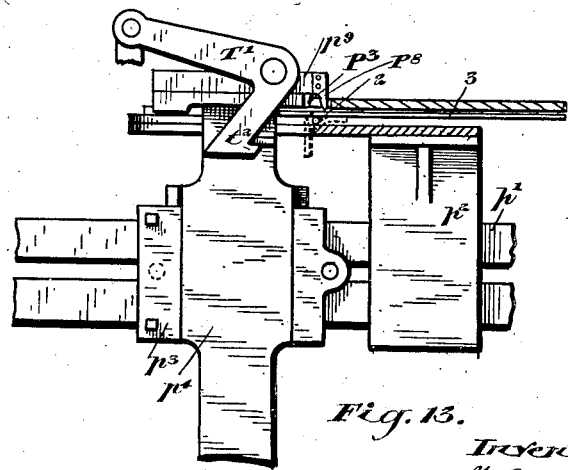
Fig. 13.
Witnesses
H. S. Young
C. A. Bate
Inventor
Thos. Patterson
by Fred B. Fetherstonhaugh
Atty.

UNITED STATES PATENT OFFICE.

THOMAS PATTERSON, OF TORONTO, CANADA, ASSIGNOR TO THE DOMINION FENCE COMPANY, LIMITED, OF TORONTO, CANADA, A CORPORATION OF CANADA.

WIRE-FENCE-MAKING MACHINE.

No. 828,772.　　　　Specification of Letters Patent.　　　　Patented Aug. 14, 1906.

Application filed February 19, 1904. Serial No. 194,385.

*To all whom it may concern:*

Be it known that I, THOMAS PATTERSON, mechanical superintendent, of the city of Toronto, in the county of York, in the Province of Ontario, Canada, have invented certain new and useful Improvements in Wire-Fence-Making Machines, of which the following is the specification.

My invention relates to improvements in wire-fence-making machines; and the object of the invention is to devise a machine of this class by which a high-class heavy wire fence may be thoroughly welded at the points of junction of the longitudinal strands and the vertical stays, the ends of the stays looped over the strands, and the longitudinal strands crimped, and thereby an extremely strong and durable fence produced.

My invention consists of a wire-fence-making machine having means for feeding the stays laterally onto the strands, electric welding devices for welding the stays onto the strands at the point of crossing, and the feeding, looping, and crimping devices, as hereinafter more particularly explained.

Figure 1 is a view in parallel perspective of the machine, showing the mechanism for making four strands of the fence, the other portion of the machine being broken away from end to end. Fig. 2 is a longitudinal section through the machine. Fig. 3 is an enlarged perspective view showing the portion of the machine at which the electric welding is accomplished. Fig. 4 is a longitudinal section through the major portion of the portion of the machine shown in Fig. 3. Fig. 5 is an enlarged perspective view of the portion of the machine in which the crimping and looping of the stays over the outside strands at the end is accomplished. Fig. 6 is a sectional detail of the feed for the stays. Fig. 7 is an enlarged detail of the commutator and arm and brushes acting therewith and operated from one of the die-supporting shafts. Fig. 8 is a sectional detail showing the commutator and brush thereof. Fig. 9 is an enlarged detail of the die-supporting arm and die. Fig. 10 is a longitudinal section through the arm and die. Fig. 11 is a detail of the die. Fig. 12 is a perspective view from the opposite side to that shown in Fig. 5, showing portion of the operating mechanism of the knuckling device which forms the end loops of the stays. Fig. 13 is a sectional detail looking at the front face of the knuckling mechanism. Fig. 14 is an enlarged detail of the crimping mechanism. Fig. 15 is a detail of the cam by which the crimping mechanism is operated. Fig. 16 is a vertical section showing the means for operating the knucklers.

In the drawings like characters of reference indicate corresponding parts in each figure.

A is the main frame of the machine, one side only of which is shown, and $a$, $a'$, $a^2$, $a^3$, $a^4$, and $a^5$ are the main uprights.

A' A' are standards carrying the cross-bars $A^2$ $A^2$ and a series of electric transformers B, corresponding in number to the number of strands of the fence, for a purpose which will hereinafter appear.

C is a table the longitudinal bars $c$ of which are supported at one end on the frame of the machine, as indicated in Figs. 1 and 2, the opposite end being supported by suitable legs. In Fig. 1 the table is shown intermediately broken away.

The longitudinal strands 2 of the fence are fed in any suitable manner between the straightening-wheels 3', and where the strand ends it is welded to another length, so as to make the strand continuous. In the drawings I have only shown four longitudinal strands, as I consider this is quite sufficient for the sake of clearness and for fully illustrating my invention. It will, however, be understood that the fence may consist of as many longitudinal strands as may be desired, and necessarily the parts of my machine which operate on such longitudinal strands as they pass through the machine will correspond in number to such longitudinal strands.

The table C is provided at its front side with a shaft D, which is journaled in suitable bearings $d$ and extends throughout the length of the table and across the machine, being supported in suitable bearings $d'$ thereon.

$d^2$ represents wheels secured on the shaft D and meshing with pinions $d^3$ on the spindles $d^4$, which are journaled in suitable bearings $d^5$ on the table and plate D', supported on the frame of the machine and extending crosswise of the same. The spindles $d^4$ have secured to their outer ends the grooved feed-wheels $D^2$. The wheels $D^2$ and their coacting parts are located at desired distances apart on a line with each other in front of the table C and of the cross-plate D', extending from side to side, and are continuously rotated, so as to feed the stays inwardly onto the longitudinal strands, as hereinbefore described.

The table C is provided with a supplemental top C', supported on longitudinal stringers $c\ c$.

$c'\ c'$ are spindles journaled in suitable bearings $c^2$, and $c^3\ c^3$ are grooved wheels located at desired distances apart on the spindles $c'\ c'$, respectively, and $c^4$ represents endless belts passing underneath the table-top C' and over it and around the grooved wheel $c^3$.

$c^5$ represents a series of wheels having segmental notches $c^6$. The wheels $c^5$ are secured on the spindle $c^7$, which is journaled in suitable bearings $c^8$. The wheels $c^5$ are located in proximity to the belts $c^4$ and are continually rotated by means of a sprocket-wheel $c^9$, deriving motion from any suitable source of power.

$C^2$ represents gaging-bars, which are located above the table-top C' and extend parallel with the belts $c^4$, which pass over the top C' just a sufficient distance so as to permit of the passage of one stay 3 at a time on the same level—that is to say, the gaging-bar $C^2$ is parallel with the belt from end to end. The stays are placed by hand upon the belts $c^4$ to the back of the gaging-bars $C^2$ and are fed forwardly by the belt to the wheels $c^5$, the segmental notches of which are of just the depth to receive a stay at a time. It will therefore be seen, as the wheels $c^5$ revolve, that upon every revolution they carry forward a stay and deposit it upon the belt at the opposite side of the wheels from which the stays one at a time are fed into the feed-wheels $D^2$, which extend across the machine and over the strands. It is now necessary to deposit the stays upon the strands preparatory to electrically welding them to the strands. In order to effect this, I provide the following mechanism. E is one of the main driving-shafts of the machine, which is journaled in suitable bearings in each side of the frame. E' is a wheel secured thereto and provided with a friction-roller $e$. $e'$ is an arm pivoted in a bracket $e^2$, secured to the frame. $e^3$ is a spiral spring connected to the arm $e'$ and to a suitable portion of the frame. $e^4$ is a spring secured on the end of the arm $e'$. $e^5$ is a cross-rod journaled in suitable bearings in the top of the frame at each end and provided with an arm $e^6$. $e^7$ is a rod connecting the arm $e^6$ to the arm $e'$.

The cross-bar or plate D' is supported on suitable brackets $d^{41}$, secured to the cross-bar $D^4$, extending from side to side of the machine. $D^5$ represents plates secured to the cross-bar $D^4$ and having longitudinal grooves underneath the same, through which the strands 2 extend. The plates $D^5$ are provided with projecting fingers $d^5$. In Fig. 3 I show one of the strands removed on the near side of the machine. I also show the machine broken away and some of the welding-dies and their supporting-arms removed for the sake of clearness.

F represents arms pivotally supported at the top on the cross-bar $f$ and subject to a normal spring-pressure rearwardly by means of the springs $f'$, pressing on the pins $f^2$ on the arms. The bottoms of the arms F are provided with notches F', into which the stay is designed to be fed onto the strands between the end of the projection $d^5$ and the end of the arm. The stay 3, lying in the wheels $D^2$, is lifted out of the same by means of the curved arms $e^8$, secured to the cross-bar $e^5$, such arms being operated from the wheel E' by the mechanism hereinbefore described and shown clearly in Figs. 2 and 4. When the stay 3 is lifted from the wheels $D^2$, it is deposited crosswise upon the plates $D^5$. As it is essential that such stays be carried onto the strands, I provide the following mechanism for effecting this purpose positively. G represents a series of fingers, each of which is provided with a beveled front end $g$ and a notch $g'$. The rear end of the finger G is connected to a cross-bar $g^2$, which extends at the ends into the blocks $g^3$, being located in the slots $g^4$ of the arms G', located one at each side of the machine and pivotally connected at the top to the frame by the pins $G^2$. $G^3$ is a bar pivotally connected at the rear to the bottom of the arm G' and at the front end pivotally connected to the swing-link $g^5$. The rear end of each bar $G^3$ at each side of the machine is connected by a spiral spring $G^6$ to a suitable portion of the frame. Each finger G lies upon the plate $D^5$ in proximity to its respective strand.

$h$ is a pin secured on each pitman H, by which the dies hereinafter referred to are drawn forward. The pins $h$ extend outwardly from the pitman H into the path of the link $g^5$, and it will consequently be seen that when the pitman H is given its forward movement, as will hereinafter appear, to draw the dies forward it will at the same time carry the link $g^5$, and consequently the arm $G^2$ and fingers G, forward and by means of the notch $g'$ carry the stay forward past the end of the plate $D^5$ and finger $d^5$ onto the strand, forcing the spring-held fingers F forward, so that the stay lies upon each strand directly between the upper and lower coacting dies I and J.

Before describing the manner in which the dies are operated I shall describe the construction of the dies themselves. The dies I and J are located on the ends of the arms I' and J', respectively. I shall describe each die in relation to the arm I'. (See Figs. 9 and 10.) $i$ is a hole extending through the end of the arm I'. $i'$ is an insulating-sleeve extending through such hole, and $i^2$ represents top and bottom insulating-plates located on each side of the end of the arm. $I^2$ is the die-holder, which is provided with an upwardly-projecting stem $i^3$, to which the ends of the metal straps 4, leading from the transformers B, are connected. $I^3$ is the shank of the die, which is provided with an annular enlargement $I^4$. Such shank extends through the sleeve $i'$ and plates $i^2$ and is secured in position by means of the nut $i^4$ at the upper end thereof. It will thus be seen that the shank of the die is insulated from the main arm $I'$. $I^5$ is the die proper, which is provided at the bottom with cross-grooves $i^6$. The die $I^5$ is secured to the bottom of the shank $i^3$ by means of the pins $i^7$ or any other suitable fastening, and the center of the die is provided with a plug $i^8$ of insulating material. The reason of forming the bottom of the die with the cross-grooves is to provide for the reception of the crossed stays and strands, and the reason of providing the center of the die with a plug of insulating material is to prevent the annealing of the crossed wires to such an extent as to render them liable to break after they have been welded together by the force of the electric current.

In order to supply the electric current to the transformers, and consequently to the dies, at the proper moment, I provide the following simple arrangement. 5 and 5' are the wires leading from the dynamo to the main switch 6, located on the switchboard 6' on the side of the machine. (See Fig. 1.) The continuation of the wire 5 leads to the transformers B, and a continuation of the wire 5' leads to the bent end of the lever 6'. 7 represents the wires, one of which leads from each transformer B to a section 8 of the commutator. It will be noticed that each transformer is suspended by a shank from a cross-plate $a^2$, the shank extending through slots $a^3$ in the cross-bars $A^2$, hereinbefore referred to. It will thus be seen that the transformers are laterally adjustable. There are a corresponding number of sections of the commutator to the strands of the fence for the purpose which will hereinafter appear. The plates $D^5$ are adjustable upon the cross-bar $D^4$ in order to permit the spacing of the strands at any desired distance apart. The arms $I'$ and $J'$, which carry the dies I and J, are adjustably secured on the cross-shafts 9 and 10 between the divided collars 9' and 10'. The shafts 9 and 10 are journaled in the cross-heads 11, located at each side of the machine and sliding on wires 11'. It will thus be seen that the dies may be adjusted laterally to suit the position of the strands.

12 and 13 are shafts journaled in suitable bearings 12' and 13' on the side of the machine and provided with cams $12^2$ and $13^2$. The shafts 12 are driven at a suitable speed, and the cams coact with the arms $I'$ and $J'$. The arm $J'$ is resiliently supported by a spring 14, and consequently the die J has a resilient support. The arm $I'$ is provided with a supplemental arm $I^5$, pivotally connected thereto near the shaft 9.

15 is a rod extending upwardly from the arm $I^5$ through a bracket 16, secured to the arm $I'$, and 17 is a spiral spring encircling the rod 15 between the nut 18 and the bracket 16, the spring exerting a normal pressure upwardly on the bracket, and consequently on the arm.

It will now be seen that the dies will be thrown together by the cams $12^2$ $13^2$, so as to bring them against the stays and strands at the point of crossing, and that such dies are cushioned, so to speak, by the springs 14 and 17, so that there is no danger of any breaking of the operating parts. When the dies are brought together, it is necessary that the current should pass into them so as to weld the strands and stays at the point of crossing. In order to reduce to a minimum the amount of current necessary to effect this welding, I provide the commutator and arm 6', hereinbefore referred to. The arm 6' is pivoted on a pin $6^2$ at the bottom of the frame and is loosely connected by a jaw $6^3$ to the end of the shaft 10. It will thus be seen that any forward movement imparted by the pitman H to the cross-heads 11, as will hereinafter appear, will convey a swinging movement to the top of the arm 6' over the commutator, and any backward movement of the cross-head 11 will give a retrograde movement to the arm 6'. This backward movement is effected by means of the bell-crank lever $11^3$, the short end of which presses against the cross-shaft 9 and the long end of which is provided with a weight $11^4$. The arm 6' carries on its upper end a substantially elliptically-formed spring-brush $6^4$, provided with a laterally-extending lip $6^5$, which normally when the commutator-arm is in the back position rests below the level of the end of the guiding-ribs 19, which are supported at one end by the belts 19' on the bracket $19^2$ and at the opposite end by the pins $19^3$ upon the slotted standards $19^4$.

It will now be seen, immediately upon the cross-heads 11 being given a forward movement and the dies being consequently brought upon the junction of the strands and stay, that the brush $6^4$ will very rapidly pass over each successive section of the commutator, and thereby momentarily throw the current from the transformer into the dies to which the sections are connected, as hereinbefore described, thus effecting the welding, while the strands and stays are being fed forward from the position of the stay underneath the die and to the rear of the spring-fingers F to the position to which it is fed, as hereinafter described. Immediately the brush has reached the last section, (the last one being a dead section,) the dies being returned by the weighted bell-crank 11³, the cross-heads carry the arm 6' backwardly, and in passing so backwardly the lateral projecting lips 6⁷ pass upon to the ribs 19 and carry the brush clear of the sections to the normal position. (Shown in Figs. 7 and 8.) It will thus be seen that the stays are successively welded from one side of the machine to the other to the strands as the dies pass forwardly and that the connection is broken before the limit of the stroke is reached, so as to enable the arm 6' to return to normal, preparatory to welding the next succeeding stay, which is fed by the mechanism hereinbefore described, which is properly timed to deliver the next stay immediately behind the spring-fingers F ready to be gripped and welded by the dies again. The strands 2 are supported by the cross-bars 20 and 21 on the hanger-brackets 22, secured to one of the cross-bars of the frame. (See Fig. 2.)

I shall now describe the means by which the strands, with the stays on them, and the dies are fed forwardly simultaneously. K and K' are shafts journaled in bearings $k$ and $k'$ in the sides of the frame. The shafts K and K' carry the sprocket-wheels K² and K³, respectively, at each end, and the sprocket-wheels K² and K³ carry the sprocket-chains K⁴. The sprocket-chains K⁴ have attached to or forming part of some of their links and at equidistances apart the bearing-blocks $k^2$, in which are secured the cross-spindles $k^3$, which are set at a determinate distance apart corresponding to the distance apart of the stays, for a purpose which will hereinafter appear. Upon the spindles I secure the collars $k^4$, having the segmental projections $k^5$, provided with notches $k^6$, through which strands are designed to pass and be held. The segmental projections $k^5$ are designed to contact with the stays, and the fronts of the segmental projections on each spindle are located at a distance apart corresponding to the distance of the stays. In fact, the amount of feed at a time is determined by the distance apart of the segmental projections.

In this specification generally I am describing only one side of the machine with four strands, as hereinbefore premised. In Fig. 2 I show the opposite side.

The sprocket-wheels are driven from a main sprocket 23, which derives movement from any suitable source of power and is so timed as to give a properly-timed movement to the sprocket-chain, and consequently to the segmental projections.

At each end of each of the spindles K³, carrying the segmental projections, I provide the arms $k^6$, provided with end friction-rollers $k^7$.

$k^8$ represents guideways formed at the inside of the sprocket-wheels and supported upon a standard $k^9$. These guideways are located toward the rear end of the sprocket-chain and are designed to form a guide for the arms $k^6$, so as to bring the segmental projections $k^5$ of the collars into proper position to receive the stay and strands when they arrive at the top portion of the chain. I also provide at the bottom of the standard $k^9$ a forwardly-extending lower guide $k^{10}$, which forms a guide to insure of the projections and arms coming down the right way from the strands, so that they will assume the proper position when they are ascending at the opposite end of the sprocket-chain.

I have hereinbefore described the pitmen H, and these pitmen are driven by the bearing-blocks $k^2$ in the following manner. The forward ends of the pitmen H are provided with inwardly-extending blocks $h^2$ and rollers $h^3$ on the outside and a connecting-rod $h^5$. On the outside of the standard $k^9$ I provide the inclined ways $h^4$. It will be seen that as the sprocket-chains are caused to move forwardly at the top the bearing-blocks $k^2$ will come in contact periodically with the blocks $h^2$ on the pitman and carry such blocks forward until the rollers $h^3$ come in contact with the inclined ways $h^4$, which as the rollers pass upwardly upon the same will throw the blocks $h^2$ from engagement with the blocks $k^2$ and up above the same. The weighted bell-crank lever 11³ now acting upon the shaft 10 will necessarily draw the pitmen H backwardly to their normal position and the dies into position above the strands at a point where the stays are deposited between them. The distance traversed by the pitman is of course so arranged as to be the distance from one stay to another, and when this distance is traveled the pitman is released and carries the parts connected thereto back to normal ready to weld the next stay. In order to hold the fence down after the stays have been welded to the strands, I provide the strips L, which are fastened at one end to the cross-bar of the frame and at the other end to a suitable cross-bar 1, supported on portion of the standard L'.

I find it is necessary in practice in a machine of this class to provide a loop in the strands, or, more properly, in the length of the fence, after the stays have been welded thereon, for the reason that to produce a properly-finished fence I have to loop the stays over, as shown in Fig. 13. This is a difficult matter, and while it can be done during the time that the stays are being welded and fed yet it cannot be done while the stays are being welded alone, and for this reason the feed has to be timed differently at one end of the machine as compared to the feed on the opposite end of the machine, and the slack is taken up continuously by having a slack loop in the length formed in the manner I shall now describe, and the inequalities of the feed are provided for. M is a roller journaled on the top of the standard L' and underneath which the strands pass. M' is a roller journaled in the top of the standard L' and over which the strands pass. N represents shields secured to the sides of the frame and connected by cross-bars $n\ n$ and having guiding-strips $n''$ secured thereto underneath which the strands are carried. $A^3$ is a supplemental frame carried on the main frame at the front or discharge end of the machine. $A^4$ is a roller upon which the fence is wound. $A^5$ represent standards secured on top of the frame $A^3$ and having secured thereto the slatted supports O and the shield or guards O'. The shields N and the shields O' serve to guide the fence and hold it in its proper position as it is passing onwardly. The fence passes from the slatted support O between the plates P and P', supported on the side standards $p$, secured in the top of the supplemental frame $A^3$. Thence the fence passes on to the toothed wheels Q into the space between the part of the teeth $q$, thence down over the guiding-roller R to the receiving-roller $A^4$. At the point where it passes between the plates P and P' the knucklers operate to form the loop. (Shown in Fig. 13.) The feed is effected at this end of the machine by means of the toothed wheels Q, which are located at a distance apart corresponding to the strands and the teeth of which are arranged at such a distance apart and of such a height as to grip the stays for the purpose of feeding the fence. $p'$ represents guiding-strips, which extend from the upper plate P over the tooth $p$. The crimping of the strands, as indicated, is effected by means of the crimping mechanism S, located between the feeding rollers Q and the guiding-roller R.

I shall first describe the mechanism and operation of the knucklers to form the end loops. (Shown in Fig. 13.) T is a cross-shaft journaled in suitable bearings in the main frame and provided with cams $t$ and $t'$. $p'\ p'$ are cross-bars secured to the standards $p$, and $p^2$ represents brackets secured to the cross-bars $p'\ p'$ and the cross-plates P'. $p^3$ represents guide-ways secured to the cross-bars $p'$, as indicated. $p^4$ is a vertical bar movable in the guideways $p^3$, and $p^5$ is a supplemental bar secured to the bar $p^4$ and provided with an open end $p^6$, having a roller $p^7$, journaled on a pin at its lower end and designed to coact with the cam $t$. The head $p^9$ of the bar $p^4$ is provided with a depending finger $P^3$ and an upwardly-extending finger $P^4$. $P^5$ is an upright secured to the cross-bars $p'$. $P^6$ is a lever fulcrumed on the upright $P^5$ and pivotally connected to the finger $P^4$ and provided with a weight $P^7$. $P^8$ is a finger depending from the head $p^9$ and to one side of the finger $P^3$. $T'$ is a bell-crank-shaped lever fulcrumed on the head $p^9$ and provided with an end finger $t^2$. $T^2$ is a bar pivotally connected to the end of the upper end of the bell-crank $T'$, and $T^3$ is a slotted bar pivotally connected to the bottom of the bar $T^2$ and provided with a roller $t^3$, designed to coact with the cam $t'$. $T^4$ is a spiral spring connected to the lower end of the bar $T^2$ and to the bent end of the upright $P^5$.

The stay 3 is fed first forward, by the means which I shall presently describe, underneath the fingers $P^3$ at each side of the machine and the cams are so set as to bring the bars $p^4$ down, and consequently the finger $P^3$, so as to force down the ends of the stays quickly over the outer strand-wires on each side of the machine. (See Fig. 13.) The stay being now fed forward slightly, the bar $p^4$ is brought down by the cam $t$ again, so as to bring the finger $P^8$ onto the top of the stay in proximity to the longitudinal strand. At the same time the cam $t'$ in rotating serves to tilt the bell-crank lever $T'$ on its pivot and throw the finger end $t^2$ against the depending end of the stay 3, (indicated by heavy dotted lines in Fig. 13,) thereby throwing or bending such stay up into the position indicated by light dotted lines in Fig. 13, so as to form a loop around the longitudinal strand 2. It will be quite readily understood that this operation takes place simultaneously at each end of the stay and like parts are provided to effect the operation. It will be noticed that the feed of the stay underneath the finger $P^3$ and then underneath the finger $P^8$ must be exact, so as to allow of the proper bending or "knuckling," as I term it, of the end of the stay, and it must also be understood that it must be locked for the same purpose, so as to hold the stay stationary during the operation and bend it straight. In order to effect this purpose, I provide the following simple mechanism. The stays by which the feeding is done, of course, as hereinbefore premised, fit into the toothed wheels. In order to rotate the wheels, I provide a ratchet-wheel Q' on the end of the shaft $q'$ and a rocking arm $Q^2$ outside the ratchet-wheel on the shaft. The ratchet-wheel Q' is secured to the shaft and the rocking arm is loose upon it and is provided with a suitably-formed pawl $q^2$ to engage with the ratchet-wheel. $Q^3$ is a lever pivoted in the frame and provided with a weight $q^4$ at one end and a connecting-bar $Q^4$ at the opposite end, connecting it to the outer end of the rocking arm $Q^2$. $T^4$ is a cam secured on the shaft T and designed to coact with the roller $Q^5$ on the lever $Q^3$. The cam $T^4$ is provided with two main rises $t^4$ and $t^5$ for a purpose which will hereinafter appear. The cam also is provided with rollers $t^6$ and $t^7$, journaled on pins in the face of the cam. $Q^6$ is a substantially bell-shaped lever, pivoted on a pin $q^5$ on the frame and provided with the end notches $q^6$ and $q^7$. The ratchet-wheel $Q'$ is provided with the laterally-extending pins $q^8$. $q^9$ is a bracket having the arms $Q^7$ and $Q^8$, provided with end notches, with which the pins $q^8$ on the ratchet $Q'$ are designed to engage. As the cam $T^4$ rotates it throws the lever $Q^3$ downwardly and by the rise $t^4$ in the cam gives the major throw, so as to bring the one stay the proper distance away from the knuckling-fingers hereinbefore described and the next stay under the first finger $P^3$. The pin $q^8$ at this juncture is brought into engagement with the first notch $q^7$ of the lever $Q^6$, and a corresponding pin $q^8$ is brought into the notch of the arm $Q^7$, thereby securely locking the feeding mechanism during the process of bending down the projecting ends of the stays over the outer strands, as indicated in Fig. 13. As the cam continues to rotate and this operation is performed the roller $t^7$ comes in contact with the lever $Q^6$ and tilts it sufficiently, so as to throw the notch $q^7$ into engagement with the pin $q^8$ and the arm $Q^8$ into engagement with the corresponding pin $q^8$, thereby locking the mechanism when the stay has been pushed forward by the next rise $t^5$ of the cam into the position for the operation of the knuckling bell-crank $T'$, hereinbefore described in reference to Fig. 13. The next succeeding roller on the face of the cam-wheel $T^4$ coming against the bell-crank lever $Q^6$ throws out the notch $q$ and the arm $Q^8$ and the pins pass on as the ratchet-wheel is given its rotary movement, as hereinbefore described, so as to feed the next stay into position underneath the first finger $P^3$. As the now partially-completed fence passes downwardly from the wheels Q the strands are given a crimp by the following mechanism. $S'$ represents crossbars secured to the legs of the supplemental frame $A^3$ and set at an angle corresponding to the incline at which the fence passes to the guiding-wheel R. $s$ represents a series of cross-bars provided with notches $s'$. $S^2$ is a bar suitably held in the cross-bars $S'$, which form guideways. $s^2$ represent pins located outside the notches $s'$. It will be noticed that the ends of the blocks $s$ are beveled, so as to permit of the stays passing over freely and yet allow of the strands to pass down between the notches $s'$ and the pins $s^2$. $s^3$ is an arm secured to the frame, and $s^4$ is a lever connected by a rod $s^5$ to the end of the bar $S^2$. $S^3$ is a peripheral cam secured on the shaft $T$ and into which extends the roller $s^6$ on the end of the lever $s^4$. It will now be understood that as the shaft $T$ revolves the cam $S^3$ will impart a reciprocating movement to the bar $S^2$, and as the longitudinal strands of the fence pass between the notched block $s$ and pins $s^2$ such pins will as the strands pass through crimp such strands throughout their length.

Although I show only one block $s$ and corresponding pins, there will be as many blocks with their corresponding pins as there are strands on the bar $S^2$.

From this description it will be seen that I have provided a very complete machine by which a fence may be formed of stays and strands electrically welded at their junction and turned out complete with practically no manual labor.

I desire also to call attention to the fact that all the operating parts are adjustable laterally, so as to make a fence of any desired number of strands, and the feeding mechanism may be disposed to make the stays at any desired distance apart.

What I claim as my invention is—

1. In a wire-fence-making machine, the combination with the main frame and means for feeding the strands horizontally thereon, of a stay-feeding device located to one side of the main frame, grooved rollers journaled in a suitable frame in alinement with each other adapted to receive the stays from said stay-feeding device, means for driving such rollers, so as to throw the stay inwardly into position on top of the strands, and means for electrically welding the stays to the strands as and for the purpose specified.

2. In a wire-fence-making machine, the combination with the main frame and strand-feeding device, a second frame located to one side of the main frame, grooved rollers secured thereto, means for driving said rollers, means on the second frame for delivering the previously-cut stays one by one to the said rollers so as to be delivered by them on top of the strands, and means for electrically welding the stays to the strands.

3. In a wire-fence-making machine, the combination with the main frame and strand-feeding device, of a stay-feeding device located to one side of the main frame, grooved rollers journaled in a suitable frame in alinement with each other and suitably driven, an endless belt supported on a suitable table at the side of the machine and extending to the rollers and means for electrically welding the stays to the strands as and for the purpose specified.

4. In a wire-fence-making machine, the combination with the grooved rollers arranged in alinement with each other and suitably supported and driven, of the stay-carrying endless belt suitably supported having one end extending into proximity with the grooved wheels, and the guards supported above the belt, so as to leave a thickness of the stay between the guards and the belt and means for electrically welding the stays to the strands after they have been deposited thereon by the grooved wheels as and for the purpose specified.

5. In a wire-fence-making machine, the combination with the grooved rollers arranged in alinement with each other and suitably supported and driven, of the stay-carrying endless belt suitably supported and having one end extending into proximity with the grooved wheels, the guards supported above the belt, so as to leave a thickness of the stay between the guards and the belt, the notched feed-wheels supported on a suitable shaft and located in proximity to the belt and means for electrically welding the stays to the strands after they have been deposited on the strands as and for the purpose specified.

6. The combination with the strand-feeding means and the grooved supplemental stay-feed wheels located on a line with each other across the main frame and suitably driven, of means for lifting the stays from such wheels, so as to throw them onto the strands and means for electrically welding the stays to the strands as and for the purpose specified.

7. The combination with the strand-feeding devices and electrical welding means, of means for feeding stays upon the strands in position to be welded thereto comprising grooved supplemental feed-wheels located on a line with each other across the main frame and suitably driven, of a rock-shaft journaled on the frame, and the arms secured to the rock-shaft and designed to extend underneath the stay, and means for rocking the shaft, as and for the purpose specified.

8. The combination with the strand-feeding devices and electrical welding means, of means for feeding stays upon the strands in position to be welded thereto comprising grooved supplemental feed-wheels located on a line with each other across the main frame and suitably driven, of a rock-shaft journaled on the frame, and the arms secured to the rock-shaft and designed to extend underneath the stay, a driving-shaft, an arm secured to the frame, a rod connecting the arm to the arm on the rock-shaft, a disk on the driving-shaft provided with a roller designed to engage with the arm, and a spring designed to normally hold the arm in a raised position, as and for the purpose specified.

9. The combination with the strand-feeding devices and the supplemental feed-wheels supported on a cross-bar on the main frame and suitably driven, and means for lifting the stay from the feed-wheels, of supporting-plates for the stays located above the path of the strands, feeding means for feeding the stays forwardly onto the strands from the plates and means for electrically welding the stays to the strands as and for the purpose specified.

10. The combination with the strand-feeding devices and the supplemental feed-wheels supported on a cross-bar on the main frame and suitably driven, and means for lifting the stay from the feed-wheels, of supporting-plates for the stays located above the path of the strands, a series of fingers provided with notched ends designed to engage with the stays, means for reciprocating such fingers and electrical welding means for welding the stays to the strands as and for the purpose specified.

11. The combination with the strand-feeding devices and electrical welding means, of stay-feeding means comprising the supplemental feed-wheels supported on a cross-bar on the main frame and suitably driven, and means for lifting the stay from the feed-wheels, of supporting-plates for the stays located above the path of the strands, a series of fingers provided with notched ends designed to engage with the stays, a cross-spindle to which the rear ends of the fingers are secured, arms pivoted on the frame and slotted as indicated, the blocks carrying the spindle, and means for imparting movement to the arms, as and for the purpose specified.

12. The combination with the strand-feeding devices and electrical welding means, of stay-feeding means comprising the supplemental feed-wheels supported on a cross-bar on the main frame and suitably driven, and means for lifting the stay from the feed-wheels, of supporting-plates for the stays located above the path of the strands, a series of fingers provided with notched ends designed to engage with the stays, a cross-spindle to which the rear ends of the fingers are secured, arms pivoted on the frame and slotted as indicated, the blocks carrying the spindle, swing-links pivoted on the frame at each end, bars connecting the swing-links and the arms, means for imparting a forward movement to the swing-links and consequently to the arms, and spring means connected to the bar designed to draw the same rearwardly, as and for the purpose specified.

13. The combination with the strand-feeding devices and electrical welding means, of stay-feeding means comprising the supplemental feed-wheels supported on a cross-bar on the main frame and suitably driven, and means for lifting the stay from the feed-wheels, of supporting-plates for the stays located above the path of the strands, a series of fingers provided with notched ends designed to engage with the stays, a cross-spindle to which the rear ends of the fingers are secured, arms pivoted on the frame and slotted as indicated, the blocks carrying the spindle, swing-links pivoted on the frame at each end, bars connecting the swing-links and the arms, a die-operating pitman suitably driven and provided with pins designed to come in contact with the swing-links on the forward movement of the pitman, and spring means connected to the bar designed to draw the same rearwardly, as and for the purpose specified.

14. The combination with the strand-feeding devices and the plates located above the path of the strands, of the fingers deriving a reciprocating movement on such plates to carry the stays from the plates onto the strands and electrical means for welding the stays to the strands as and for the purpose specified.

15. The combination with the strand-feeding devices and the plates located above the path of the strands, of the fingers deriving a reciprocating movement on such plates to carry the stays from the plates onto the strands, and spring-held arms located opposite the forward ends of the plates and designed to form a resilient stop for the stays and electrical means for welding the stays to the strands as and for the purpose specified.

16. In a machine of the class described, horizontal plates, downwardly-inclined spring-arms in yielding contact with the plates so as to hold the stays thereon, dies operating between said arms onto the crossed top of the stay and strand, and electrical connections to such dies, substantially as described.

17. The combination with the spring-arms and plates, of the dies designed to operate between the spring-arms onto the crossed top of the stay and strand, the frame provided with slotted cross-bars, and transformers adjustably held in such cross-bars, and electrical connections to the transformers and from the transformers to the dies as and for the purpose specified.

18. In a wire-fence-making machine, the combination with the die-supporting arm, of an insulating-sleeve secured in the end thereof, end insulating-disks surrounding the insulating-sleeve and the die provided with an annular enlargement at the bottom and extending through the insulating-sleeve and provided with a suitable nut for holding it in the insulating-sleeve as and for the purpose specified.

19. In a fence-making machine, the combination with the die-shank, of the die proper provided with crossed grooves in the face thereof, means for securing it to the bottom of the shank and an insulating-plug located in the center of the die at the crossing of the grooves as and for the purpose specified.

20. The combination with the arms and dies secured to the end thereof and the shaft supporting the arms suitably supported in the frame, of means for tilting the arms, so as to bring the dies together onto the crossed strands and stay and electric connections to such dies as and for the purpose specified.

21. The combination with the arms and dies secured to the end thereof and the shaft supporting the arms suitably supported in the frame, of cross-shafts suitably journaled in the frame and driven and provided with cams designed to operate against the free ends of the arms and means for supplying electric current to the dies as and for the purpose specified.

22. The combination with the shafts and arms carrying the dies secured thereon and means for supplying electric current to the dies, of a spring engaging the end of the lower arm and suitably supported on the frame, a supplemental arm pivotally connected to the upper arm, a rod extending upwardly therefrom, a bracket secured on the upper arm and a spiral spring encircling the rod between the bracket and a collar on the rod and means for separating the arms, so as to throw the dies together as and for the purpose specified.

23. The combination with the shafts and arms carrying the dies secured thereon, and means for supplying electric current to the dies, of a spring engaging the end of the lower arm and suitably supported on the frame, a supplemental arm pivotally connected to the upper arm, a rod extending upwardly therefrom, a bracket secured on the upper arm and a spiral spring encircling the rod between the bracket and a collar on the rod, and the shafts provided with cams designed to separate the arms as and for the purpose specified.

24. The combination with the cross-shafts and arms and dies carried by the same, and the movable cross-heads carrying the cross-shafts, of means for imparting a forward movement to the arms and consequently to the dies and means for supplying electric current to the dies as and for the purpose specified.

25. The combination with the cross-shafts and arms and dies carried by the same and the movable cross-heads carrying the cross-shafts, of means for imparting a forward movement to the arms and consequently to the dies and means for imparting a rearward movement thereto, and means for supplying electric current to the dies as and for the purpose specified.

26. The combination with the cross-shafts and arms and dies carried by the same and the cross-heads carrying the cross-shafts, of means for imparting a forward movement to the arms and consequently to the dies, a bell-crank weighted lever designed to come in contact with the cross-shaft and means for supplying electric current to the dies as and for the purpose specified.

27. The combination with the cross-shafts and arms and dies carried by the same and the cross-heads carrying the cross-shafts, of feeding means for the strands designed to engage with the stays secured to the strands, and means connecting such feeding means to the cross-heads for imparting a forward movement to such cross-heads and consequently to the arms and means for supplying electric current to the dies as and for the purpose specified.

28. The combination with the cross-shafts and arms and dies carried by the same and the cross-heads carrying the cross-shafts, of feeding means for the strands designed to engage with the stays secured to the strands, and pitmen having an intermittent connection to the feeding means at one end and a connection to the cross-heads at the other and means for supplying electric current to the dies as and for the purpose specified.

29. In a fence-making machine, the combination with the main circuit-wires, the transformers, the dies, the connections from the transformers to the dies, the commutator supported on the frame and the connection from each transformer to each section of the commutator, of an arm pivoted on the frame and provided at the top with a brush to which one end of the main circuit-wire is connected and means for throwing such arm, so as to bring the brush successively over the sections of the commutator as and for the purpose specified.

30. In a fence-making machine, the combination with the main circuit-wires, the transformers, the dies, the connections from the transformers to the dies, the commutator supported on the frame and the connection from each transformer to each section of the commutator, of an arm pivoted on the frame and provided at the top with a brush to which one end of the main circuit-wire is connected, means for throwing such arm, so as to bring the brush successively over the sections of the commutator, and means for lifting the brush from the commutator-sections on the return movement as and for the purpose specified.

31. In a fence-making machine, the combination with the main circuit-wires, the transformers, the dies, the connections from the transformers to the dies, the commutator supported on the frame and the connection from each transformer to each section of the commutator, of an arm pivoted on the frame and provided at the top with a brush to which one end of the main circuit-wire is connected, means for throwing such arm, so as to bring the brush successively over the sections of the commutator, the laterally-extending lips attached to the brush and the guiding-ribs supported on each side of the commutator and above the same as and for the purpose specified.

32. In a fence-making machine, the combination with the main circuit-wires, the transformers, the dies, the connections from the transformers to the dies, the commutator supported on the frame and the connection from each transformer to each section of the commutator, of an arm pivoted on the frame and provided at the top with a brush to which one end of the main circuit-wire is connected, the cross-head supported in suitable guide-ways in the frame and means for reciprocating the same, and projections from the arm over one of the shafts journaled in the cross-head as and for the purpose specified.

33. The combination with the arms and dies and cross-heads carrying the same and means for supplying electric current to the dies, and the cross-shafts and sprockets wheels and chains and bearings on the chain-carrying the feeding-spindles, of the pitmen connected to the cross-heads at one end and extending at the opposite end over the sprocket-chains and having an inward projection designed to be engaged by the bearings for the spindles as and for the purpose specified.

34. The combination with the arms and dies and cross-heads carrying the same and means for supplying electric current to the dies and the cross-shafts and sprocket-wheels and chains and bearings on the chains carrying the feeding-spindles, of the pitmen connected to the cross-heads at one end and extending at the opposite end over the sprocket-chains and having an inward projection designed to be engaged by the bearings for the spindles, and inclined raised projections attached to the frame and rollers pivoted on the pitmen designed to rise on such inclined projections as and for the purpose specified.

THOMAS PATTERSON.

Witnesses:
M. McLaren,
A. Newlands.